(12) United States Patent
Hartland et al.

(10) Patent No.: US 8,181,728 B2
(45) Date of Patent: May 22, 2012

(54) AUTOMOTIVE VEHICLE ENGINE APPARATUS

(75) Inventors: Derk Hartland, Lake Forest, CA (US); Chris P. Theodore, Birmingham, MI (US); Daniel D. Agnew, Lapeer, MI (US); Marc Musial, Leonard, MI (US); William A. Frazer, Costa Mesa, CA (US); Gregory Butler, Lapeer, MI (US); Robert S. Simons, Irvine, CA (US)

(73) Assignee: MJ Acquisitions, Inc., Tecumseh, MI (US)

( * ) Notice: Subject to any disclaimer, the term of this patent is extended or adjusted under 35 U.S.C. 154(b) by 644 days.

(21) Appl. No.: 12/211,249

(22) Filed: Sep. 16, 2008

(65) Prior Publication Data

US 2009/0260906 A1  Oct. 22, 2009

Related U.S. Application Data

(60) Provisional application No. 61/045,737, filed on Apr. 17, 2008.

(51) Int. Cl.
*B60K 13/06* (2006.01)

(52) U.S. Cl. ........ 180/68.3; 180/68.1

(58) Field of Classification Search ........ 180/68.3, 180/68.1, 68.2, 69.2
See application file for complete search history.

(56) References Cited

U.S. PATENT DOCUMENTS

| | | | |
|---|---|---|---|
| 1,883,464 A | 10/1932 | Ball | |
| 2,571,256 A | 10/1951 | King | |
| 2,881,860 A * | 4/1959 | Ternes | 96/383 |
| 2,897,916 A * | 8/1959 | Probst | 180/68.3 |
| 2,963,006 A | 12/1960 | Karde | |
| 3,249,172 A * | 5/1966 | De Lorean | 180/68.3 |
| D212,877 S | 12/1968 | Krans | |
| 3,481,117 A * | 12/1969 | McKinlay | 55/385.3 |
| 3,481,119 A * | 12/1969 | McKinlay | 55/419 |
| 3,641,746 A * | 2/1972 | Smith et al. | 55/385.3 |
| 4,058,096 A | 11/1977 | Brown | |
| 4,300,511 A * | 11/1981 | Lang | 123/520 |
| 4,420,057 A * | 12/1983 | Omote et al. | 180/68.3 |
| 4,533,012 A * | 8/1985 | Komoda | 180/68.3 |
| 4,723,526 A | 2/1988 | Horiuchi et al. | |
| 4,778,029 A * | 10/1988 | Thornburgh | 181/229 |
| 4,831,981 A * | 5/1989 | Kitano | 123/198 E |
| 4,878,460 A | 11/1989 | Uchida et al. | |
| 4,896,734 A * | 1/1990 | Horiuchi et al. | 180/68.3 |

(Continued)

FOREIGN PATENT DOCUMENTS

AU  2006202679  10/2006

(Continued)

OTHER PUBLICATIONS

Afterthoughts Auto, "Dodge Charger Shaker System", 1 page, Copyright 2000-2007.

(Continued)

*Primary Examiner* — Jeffrey J Restifo
(74) *Attorney, Agent, or Firm* — Novak Druce + Quigg LLP

(57) ABSTRACT

An automotive vehicle engine apparatus includes an air intake system. In a further aspect of the present application, an automotive vehicle engine apparatus includes an air intake manifold, an air box and an air scoop. Another aspect of the present application employs an air intake shaker and a supercharger. A method of manufacturing and/or operating an air intake system is also provided.

13 Claims, 11 Drawing Sheets

U.S. PATENT DOCUMENTS

| | | | |
|---|---|---|---|
| 4,911,135 A | | 3/1990 | Nishimura et al. |
| 4,932,490 A | * | 6/1990 | Dewey .................... 180/68.3 |
| 4,971,172 A | * | 11/1990 | Hoffman et al. ........... 180/68.3 |
| 4,977,865 A | | 12/1990 | Hiraoka et al. |
| 5,012,771 A | | 5/1991 | Oda et al. |
| 5,022,479 A | * | 6/1991 | Kiser et al. ............... 180/68.3 |
| 5,042,603 A | * | 8/1991 | Olson ..................... 180/68.3 |
| 5,054,567 A | * | 10/1991 | Hoffman .................. 180/68.2 |
| 5,058,558 A | | 10/1991 | Ueda et al. |
| 5,085,199 A | | 2/1992 | Sado et al. |
| D328,063 S | | 7/1992 | Yunes |
| 5,147,430 A | * | 9/1992 | Kidd ........................ 55/385.3 |
| 5,195,484 A | * | 3/1993 | Knapp ..................... 123/198 E |
| 5,392,751 A | | 2/1995 | Matsubara et al. |
| 5,448,982 A | | 9/1995 | Arakawa et al. |
| 5,564,513 A | * | 10/1996 | Wible et al. .............. 180/68.3 |
| 5,660,243 A | * | 8/1997 | Anzalone et al. .......... 180/68.1 |
| 5,911,211 A | | 6/1999 | Uchida |
| 6,006,540 A | * | 12/1999 | Coletti ...................... 62/430 |
| 6,021,764 A | | 2/2000 | Koyama |
| 6,029,637 A | | 2/2000 | Prior |
| 6,079,394 A | | 6/2000 | Abthoff et al. |
| D429,672 S | | 8/2000 | Miyagishma et al. |
| 6,098,586 A | | 8/2000 | Bloomer |
| 6,227,179 B1 | | 5/2001 | Eiermann et al. |
| 6,405,692 B1 | | 6/2002 | Christiansen |
| 6,463,901 B1 | * | 10/2002 | Cuddihee et al. ......... 123/184.21 |
| D491,503 S | | 6/2004 | Zyskowski |
| 6,837,195 B2 | | 1/2005 | Suwazono |
| 6,923,166 B2 | | 8/2005 | Barnes et al. |
| 6,941,926 B2 | * | 9/2005 | Fagala ....................... 123/336 |
| 7,011,079 B2 | | 3/2006 | Park |
| D528,482 S | | 9/2006 | Hamburger |
| 7,137,384 B1 | | 11/2006 | Kavadeles |
| 7,201,157 B1 | | 4/2007 | Kavadeles |
| 7,523,798 B2 | * | 4/2009 | Muramatsu et al. ....... 180/68.1 |
| 7,597,088 B2 | * | 10/2009 | Tally ........................ 123/559.1 |
| 7,794,525 B2 | * | 9/2010 | Fiello ........................ 95/273 |
| 2005/0150483 A1 | | 7/2005 | Sorensen et al. |
| 2006/0157036 A1 | | 7/2006 | Andersen |
| 2007/0107704 A1 | | 5/2007 | Billings et al. |
| 2007/0175456 A1 | * | 8/2007 | Tally ........................ 123/559.1 |
| 2008/0083575 A1 | | 4/2008 | Smith |
| 2009/0260906 A1 | * | 10/2009 | Hartland et al. ........... 180/68.3 |
| 2010/0252347 A1 | * | 10/2010 | Khouw et al. ............. 180/68.3 |

FOREIGN PATENT DOCUMENTS

| | | |
|---|---|---|
| AU | 2006100924 | 11/2006 |
| WO | WO 2006/099668 | 9/2006 |

OTHER PUBLICATIONS

Classic Design Concepts, "Charger Shaker System", © 2007, 2 pages.

http://pontiactransamshakers.homestead.com, "Functional Shaker Hood Scoops", Apr. 11, 2008, 3 pages.

SAE ISBN 1-560910372-X, Bosch 3rd Edition, "Turbochargers and Superchargers for Internal-Combustion Engines", pp. 418-423.

Saleen Corporate Office, "Hood Scoop, S302 MOD", prior to Mar. 25, 2008, 1 page.

Saleen Mustang Engine Compartment, 6 photographs (offered for sale prior to 2008).

Saleen Speedlab Series VI Jul. 2005 Mustang Kits; Installation Manual; Manual P/N: 10-8002-C115171J; entire manual; (published prior to 2008).

www.auto-n-vest.com/mustang.htm, "Auto Investors", 2 pages, Apr. 2008.

www.conceptcarz.com/vehicle/Z7937/Plymouth-Barracuda/default.aspx, "1970 Plymouth Barracuda", 14 pages, Apr. 16, 2008.

www.mustangworld.com/ourpics/news/sema00/cdc.htm; "Mustangworld at Sema 2000", 4 pages, Apr. 16, 2008.

www.perogie.com/ShakerRamAir.htm, "Shaker and Ram Air Assemblies", Apr. 16, 2008, 4 pages.

www.thepontiactransampage.com/shaker.html, "Trans Am Shaker Assemblies", Apr. 11, 2008, 6 pages.

* cited by examiner

AUTOMOTIVE VEHICLE ENGINE APPARATUS

CROSS-REFERENCE TO RELATED APPLICATIONS

This application claims the benefit of U.S. Provisional Application No. 61/045,737, filed on Apr. 17, 2008. The entire disclosure of the above application is incorporated herein by reference.

BACKGROUND

The present invention relates generally to an automotive vehicle apparatus and more particularly to an air intake system for an automotive vehicle engine.

Air intake systems are known for automotive vehicle engines. Such traditional systems are disclosed in the following U.S. Pat. No. 5,058,558 entitled "Air Feeding System for a Vehicle Engine Equipped with a Supercharger" which issued to Ueda et al. on Oct. 22, 1991; U.S. Pat. No. 5,448,982 entitled "Intake System for an Internal Combustion Engine with a Supercharger" which issued to Arakawa et al. on Sep. 12, 1995; and U.S. Pat. No. 6,463,901 entitled "Method and Device for Improving Air Intake for Fuel Injection Engines" which issued to Cuddihee, Sr. et al. on Oct. 15, 2002. All of these patents are incorporated by reference herein. Each of these traditional systems, however, disadvantageously locate its air box, containing an air filter, remotely away from both the air intake manifold and air inlet. Elongated air pipes or tubes snake throughout the engine compartment between the inlet, air box and manifold, thereby allowing the incoming air to be heated by the engine and lose pressure due to the circuitous and elongated tube routes. Furthermore, superchargers are typically ineffective if the intake air exceeds approximately 150° F.

SUMMARY

In accordance with the present invention, an automotive vehicle engine apparatus includes an air intake system. In a further aspect of the present invention, an automotive vehicle engine apparatus includes an air intake manifold, an air box and an air scoop. Another aspect of the present invention employs an air intake shaker and a supercharger. A method of manufacturing and/or operating an air intake system is also provided.

The automotive vehicle engine apparatus of the present application is advantageous over traditional constructions since the apparatus of the present application shortens and simplifies the flow path for the intake air between an inlet of the scoop or shaker, and an inlet of a manifold assembly. This shortened, simplified and more direct air flow routing minimizes undesirable heating of the intake air and minimizes pressure drops of the intake air. Accordingly, the apparatus of the present application is expected to increase engine power output by approximately 150 hp. The apparatus of the present application also is much more compact and integrated into an optionally preassembled air intake unit and/or kit. In other words, there is direct feeding of the air from the scoop inlet to a throttle coupled to the manifold assembly within a flow path length of less than about ten inches. Moreover, the intake air flow path and conduits are rigidly and directly mounted to the manifold assembly. These rigid conduits are advantageously employed for an embodiment employing the shaker mounted onto the manifold assembly since both components are intended to shake or vibrate together, but independently from the vehicle hood, when the engine is operating. As contrasted to conventional scoops connected to circular air boxes for carburetor engines with radial air flow within the circular air box (when viewed from above), the present apparatus has a majority of the incoming air flowing along a predominantly and generally straight and laminar path through the air box. It should also be appreciated that the compact and integrated construction of the present air intake system offers pleasing aesthetic and styling benefits.

An embodiment of the apparatus of the present application advantageously provides a tilted air intake filter in the air box to assist in water drainage. Furthermore, at least a majority of the air box, air filter, scoop and intake air flow path (between the scoop inlet and the manifold assembly) are directly above the manifold assembly. Water management features are also provided within the air box to limit the amount of water that may contact the air filter. Various walls, dams, a sump and drains are provided to perform this task. Further areas of applicability will become apparent from the description and drawings provided herein taken in conjunction with the appended claims. It should be understood that the description and specific examples are intended for purposes of illustration only and are not intended to limit the scope of the present disclosure.

DRAWINGS

DETAILED DESCRIPTION

Figure 1:
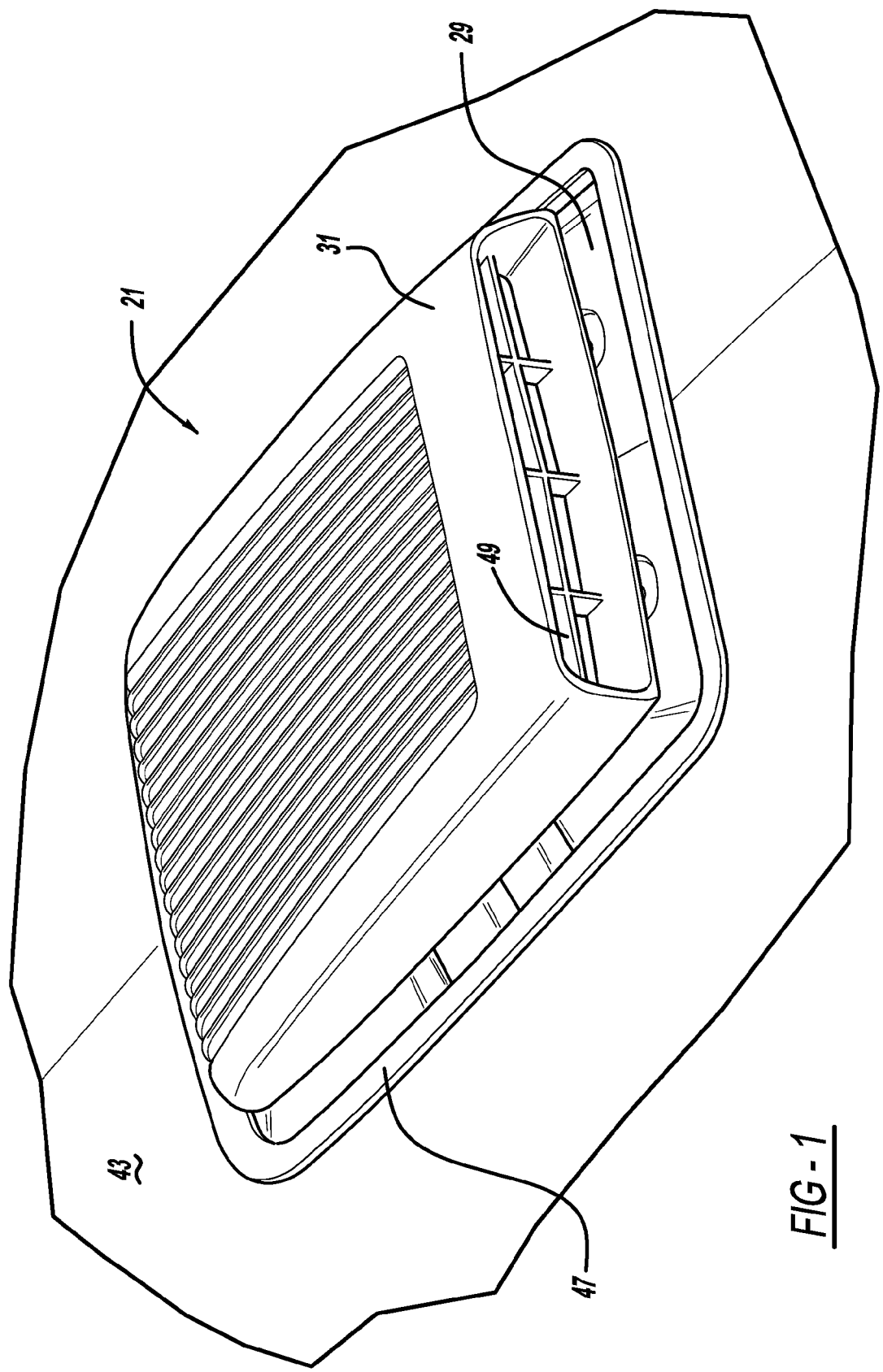
FIG. 1 is a front perspective view showing the preferred embodiment of an automotive vehicle engine apparatus projecting through a vehicle hood, of the present application.
Figure 2:
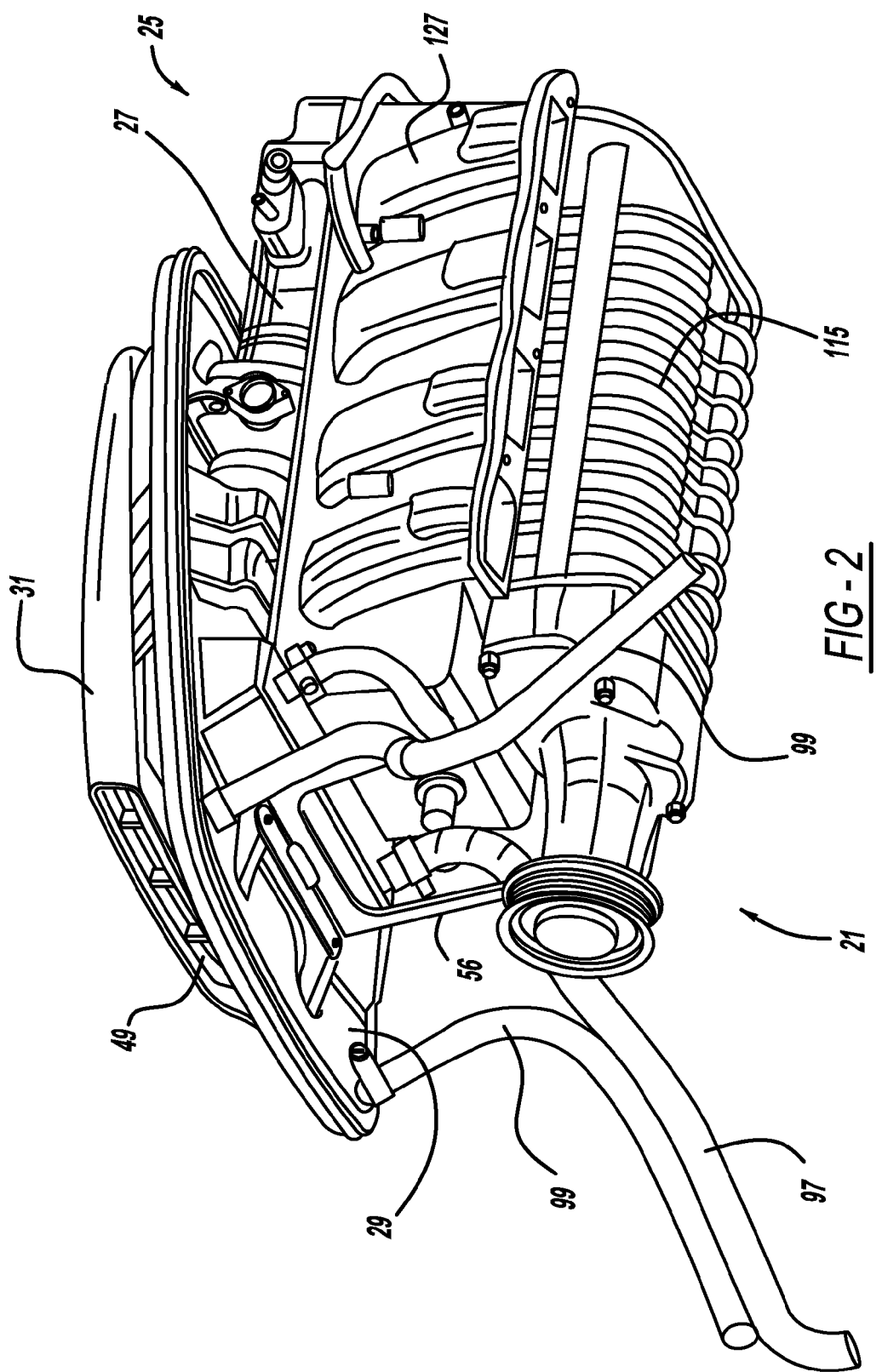
FIG. 2 is a bottom, front perspective view showing the preferred embodiment apparatus.
Figure 3:
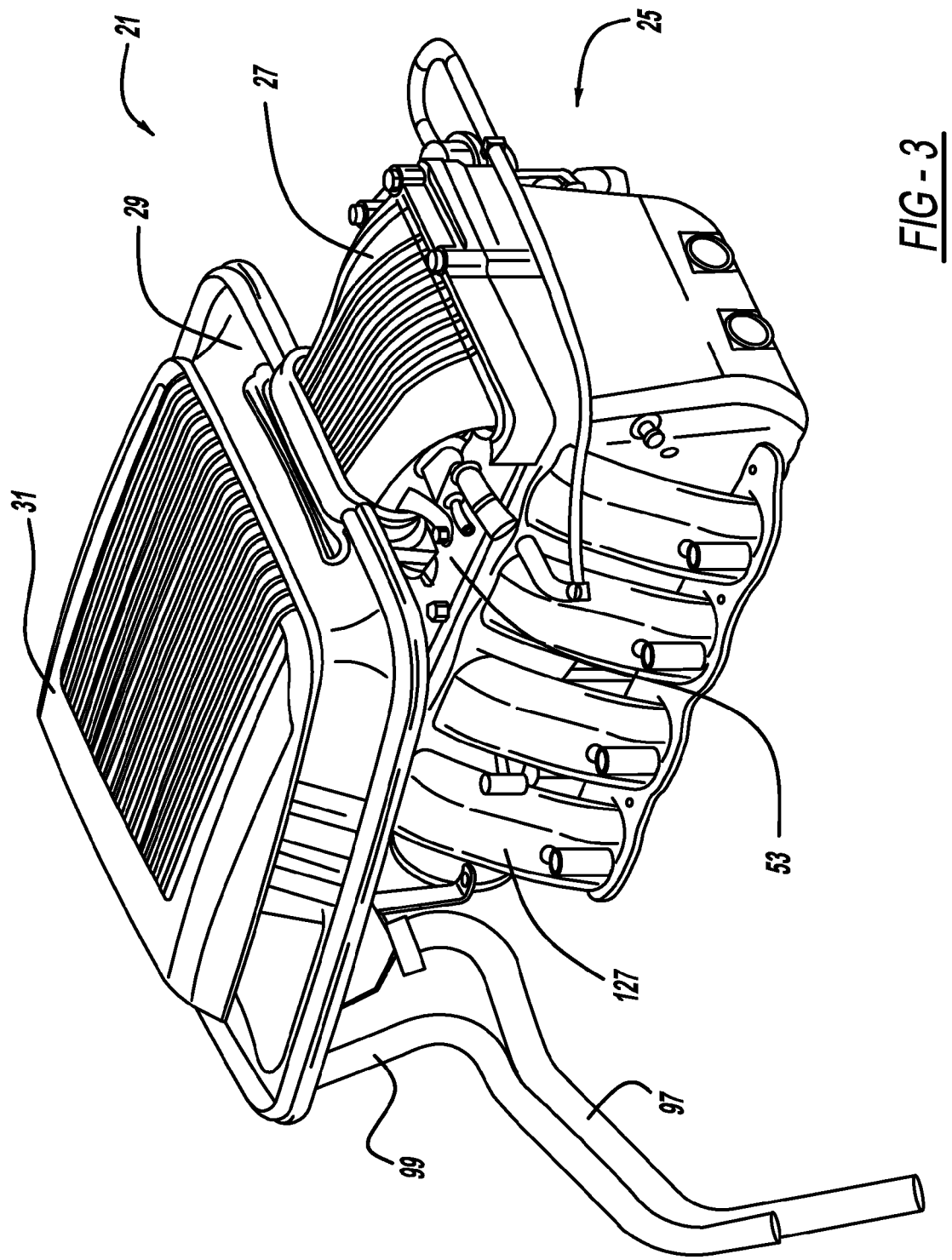
FIG. 3 is a rear perspective view showing the preferred embodiment apparatus.

Referring to FIGS. 1 through 4, the preferred embodiment of an automotive vehicle engine apparatus 21 includes an internal combustion engine 23, an air intake manifold assembly 25, a snorkel conduit 27, an air box 29, and a scoop 31. Scoop 31 and an upper section of air box 29 protrude through a hole 41 within a vehicle hood 43. A polymeric trim ring 47 is attached to hood 43 and surrounds hole 41. A bulb-type weatherstrip 45 is attached to a peripheral flange transversely extending from air box 29. A lower surface of hood 43 and/or trim ring 47 downwardly compresses the bulb of weather strip 45 to create a flexible seal therebetween. Drain holes and optional drain tubes are located inwardly of weather strip 45 on the flange of air box 29 so as to expel water collected on the air box. This hood opening and scoop configuration allow scoop 31 and air box 29 to shake and vibrate directly with engine 23 when the engine is operating, thereby allowing the scoop and air box to act as a "shaker" moving independently of the hood and vehicle body. An inlet 49 of scoop 31 is preferably oriented in the forward facing direction of vehicular travel and operably accesses air external to the vehicle which is rammed and/or sucked into the air intake system during engine operation. A grille is positioned within inlet 49. It is alternately envisioned that scoop 31 is reversed such that its inlet is rearwardly facing (i.e., toward a vehicle windshield) and receives incoming air in part due to the turbulent air flow during vehicle operation.

Figure 5:
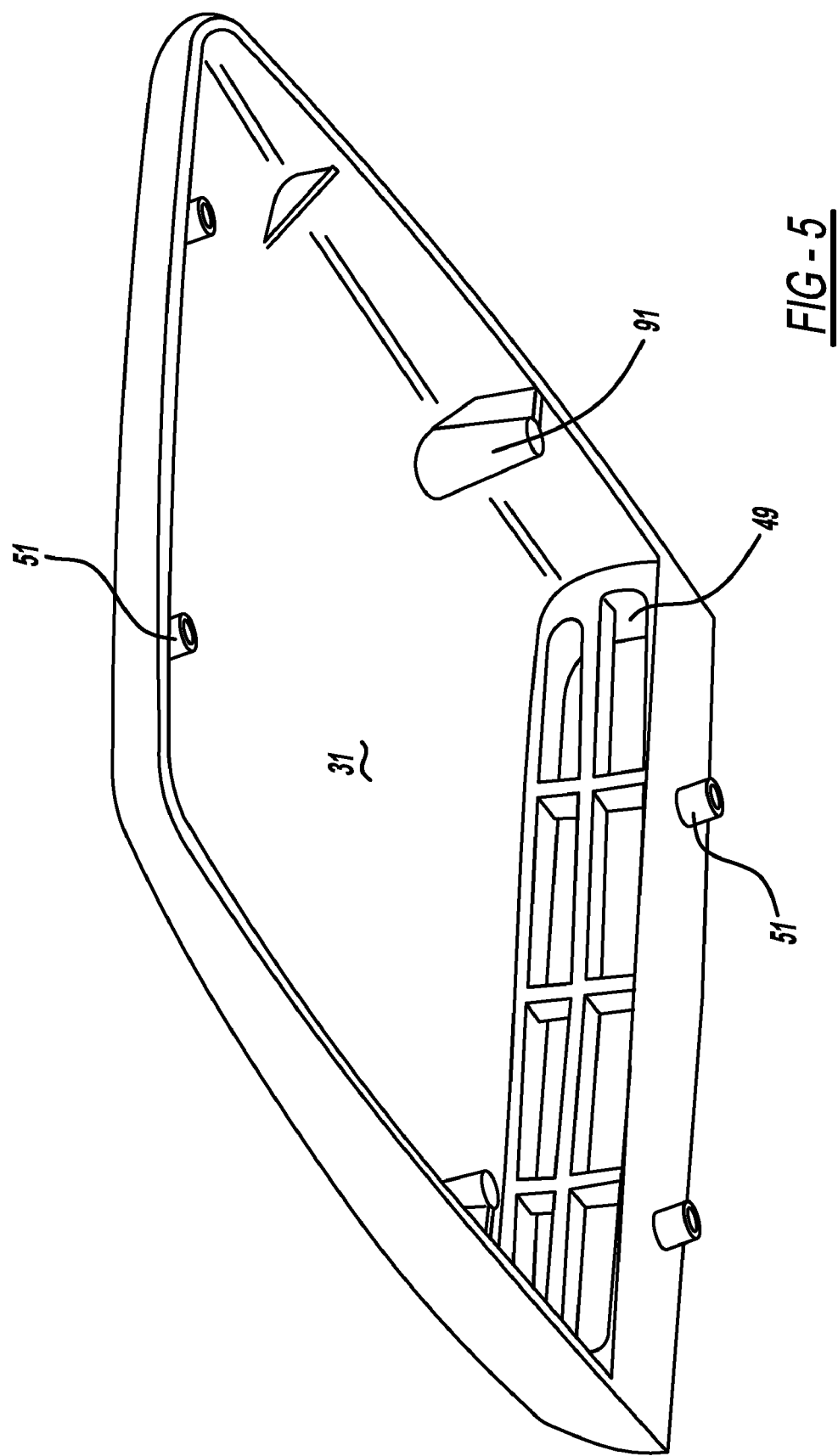
FIG. 5 is a bottom, rear perspective view showing a scoop employed in the preferred embodiment apparatus.
Figure 7:
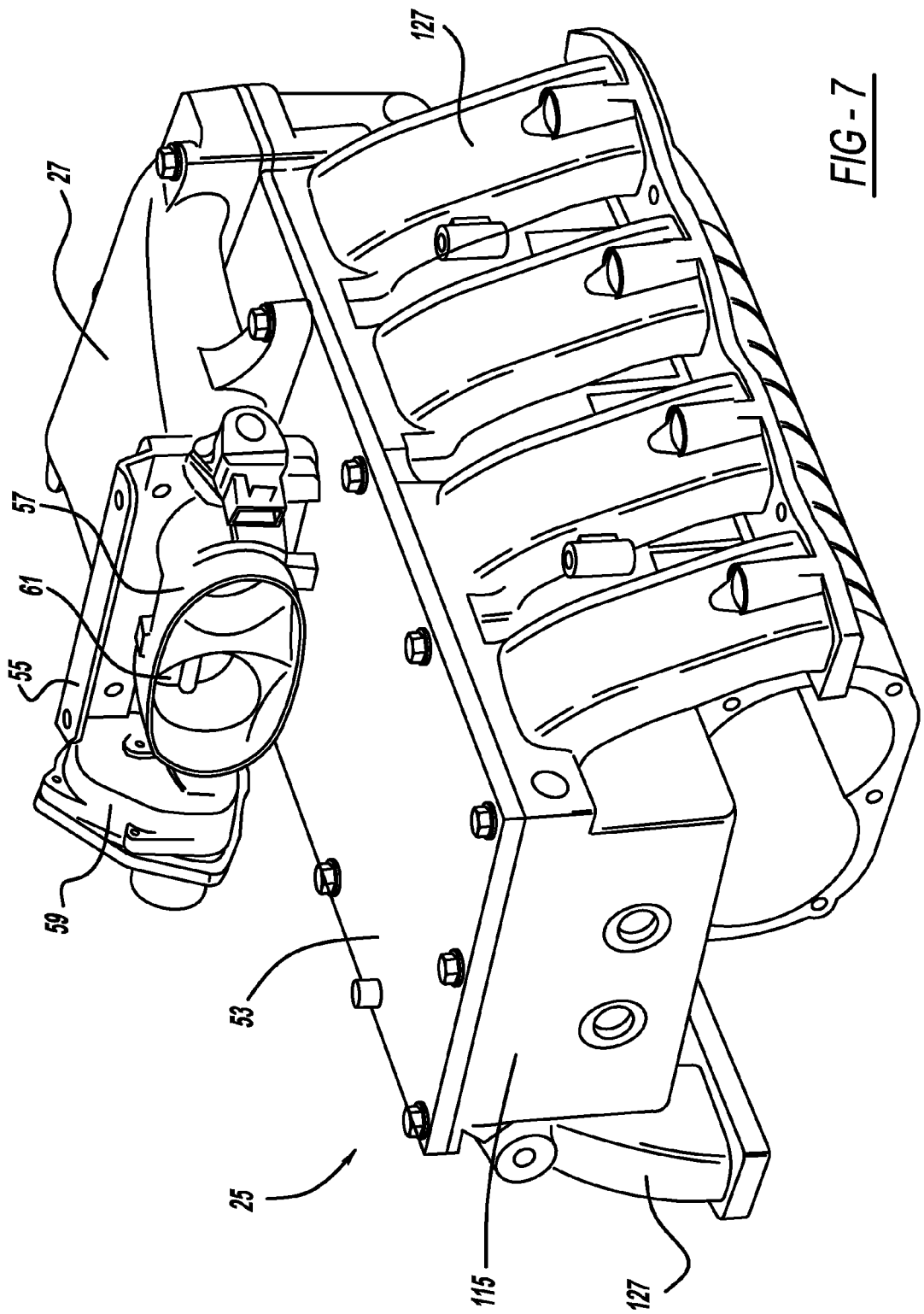
FIG. 7 is a front perspective view showing the preferred embodiment apparatus with the scoop and an air box removed.
Figure 8:
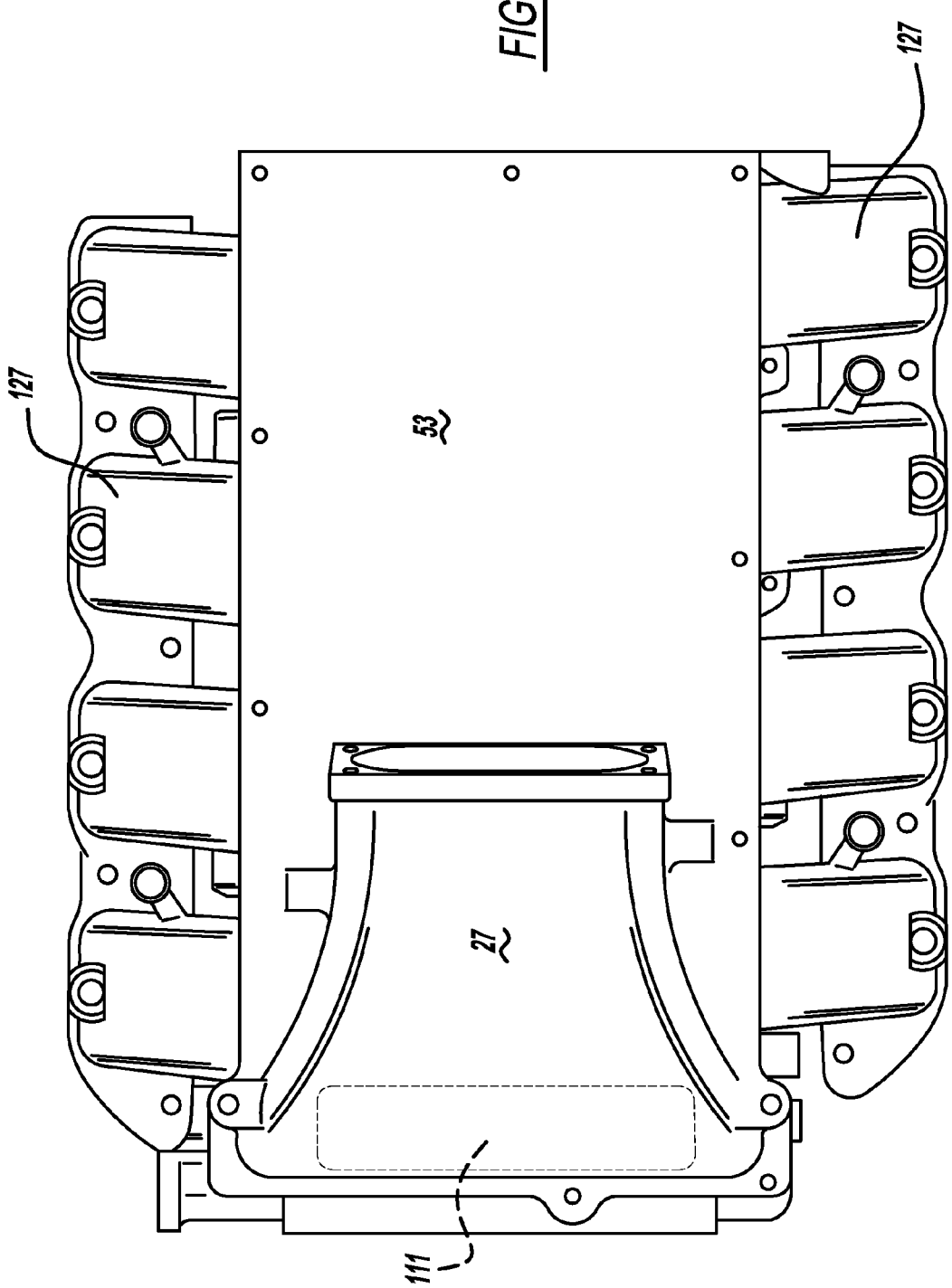
FIG. 8 is a top elevational view showing a manifold assembly and snorkel employed in the preferred embodiment apparatus.
Figure 9:
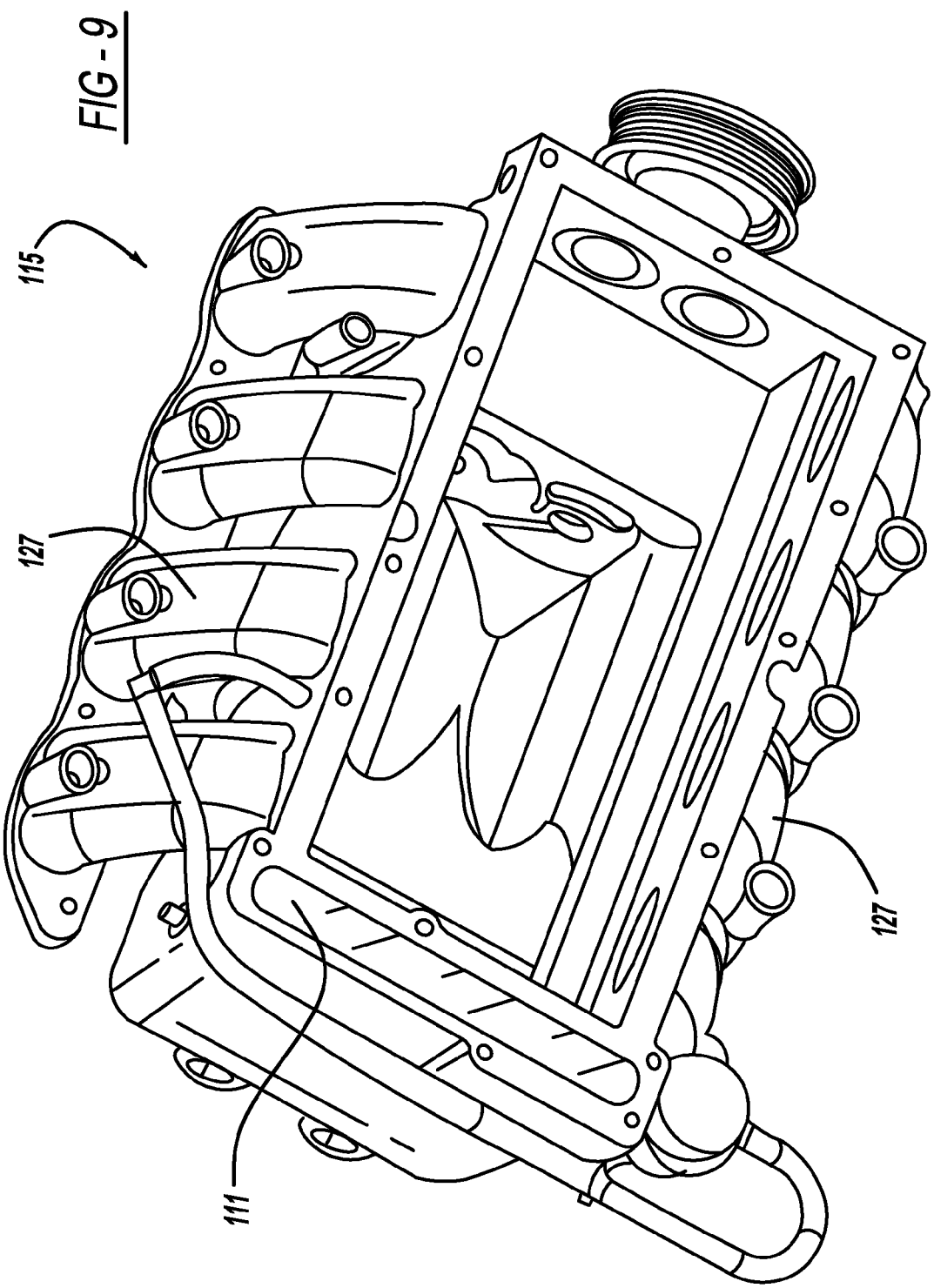
FIG. 9 is a rear perspective view showing a manifold employed in the preferred embodiment apparatus.
Figure 10:
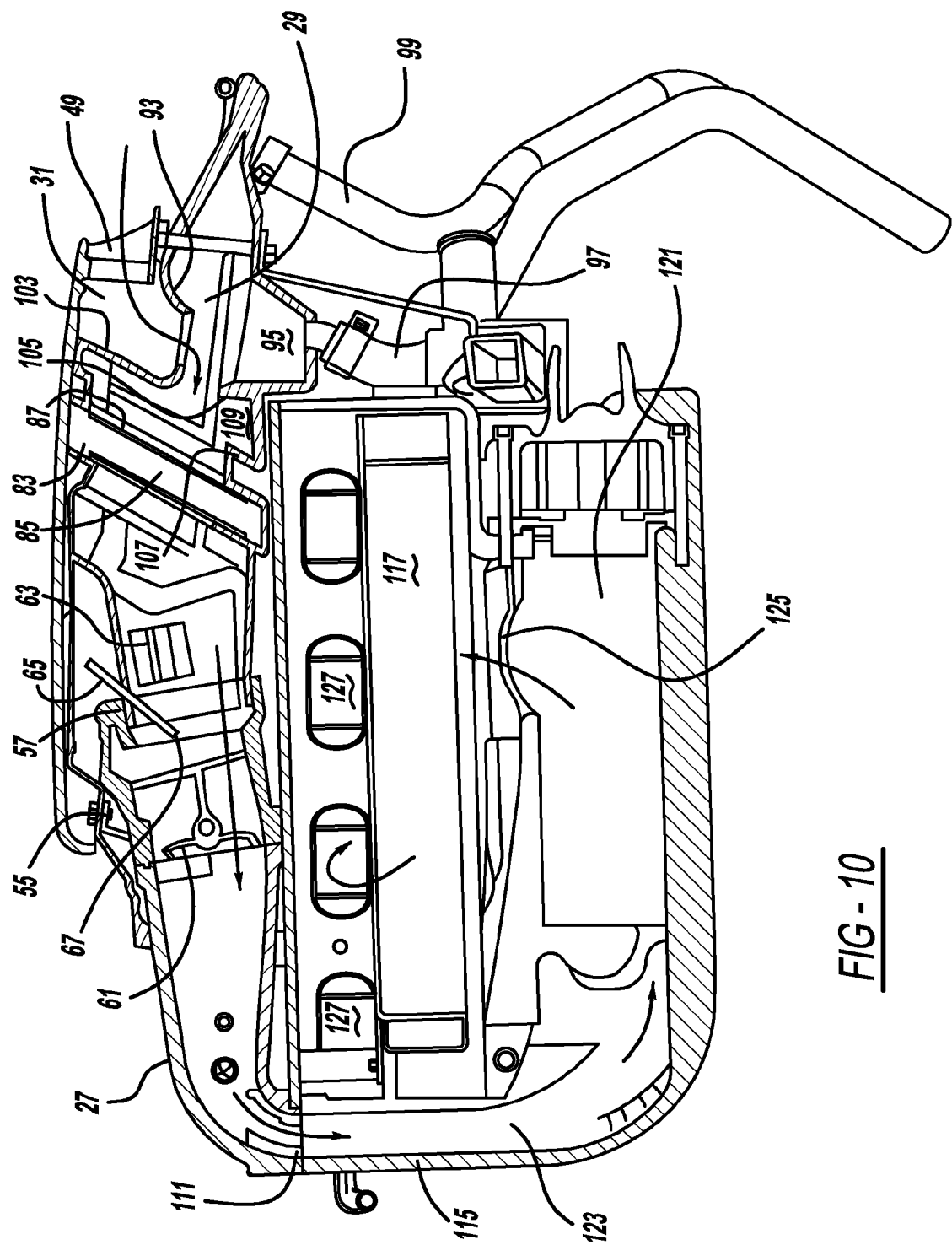
FIG. 10 is a longitudinal cross-sectional view showing the preferred embodiment apparatus.

Scoop 31 has a set of internally threaded bosses 51 (see FIG. 5) which allow for scoop 31 to be directly mounted on top of air box 29 via screws. FIGS. 7 and 8 show the direct and rigid mounting of snorkel 27 onto lid 53 of manifold assembly 25. A bracket 55 upwardly projects from a leading section of snorkel 27 for attachment to and supporting a rear portion of air box 29 via ball stud fasteners. A bracket 56 supports a leading end of air box 29. Scoop 31 is coupled to bracket 56 via fasteners 58. A throttle valve 57 is mounted between air box 29 and snorkel 27 for controlling air flow therebetween. An electric motor actuator 59 operably controls rotation of the pair of valve closures 61. FIG. 10 shows a mass air flow sensor 63 mounted to air box 29 to properly determine the air flow through this air intake system. A PCV air make up nipple 65 is also mounted to air box 29 having an open end 67 in communication with the intake air flow path. Nipple 65 is oriented at an angle and positioned downstream from mass air flow sensor 63 to minimize contamination of mass air flow sensor 63 with emissions from the positive crankcase ventilation system.

Figure 6:
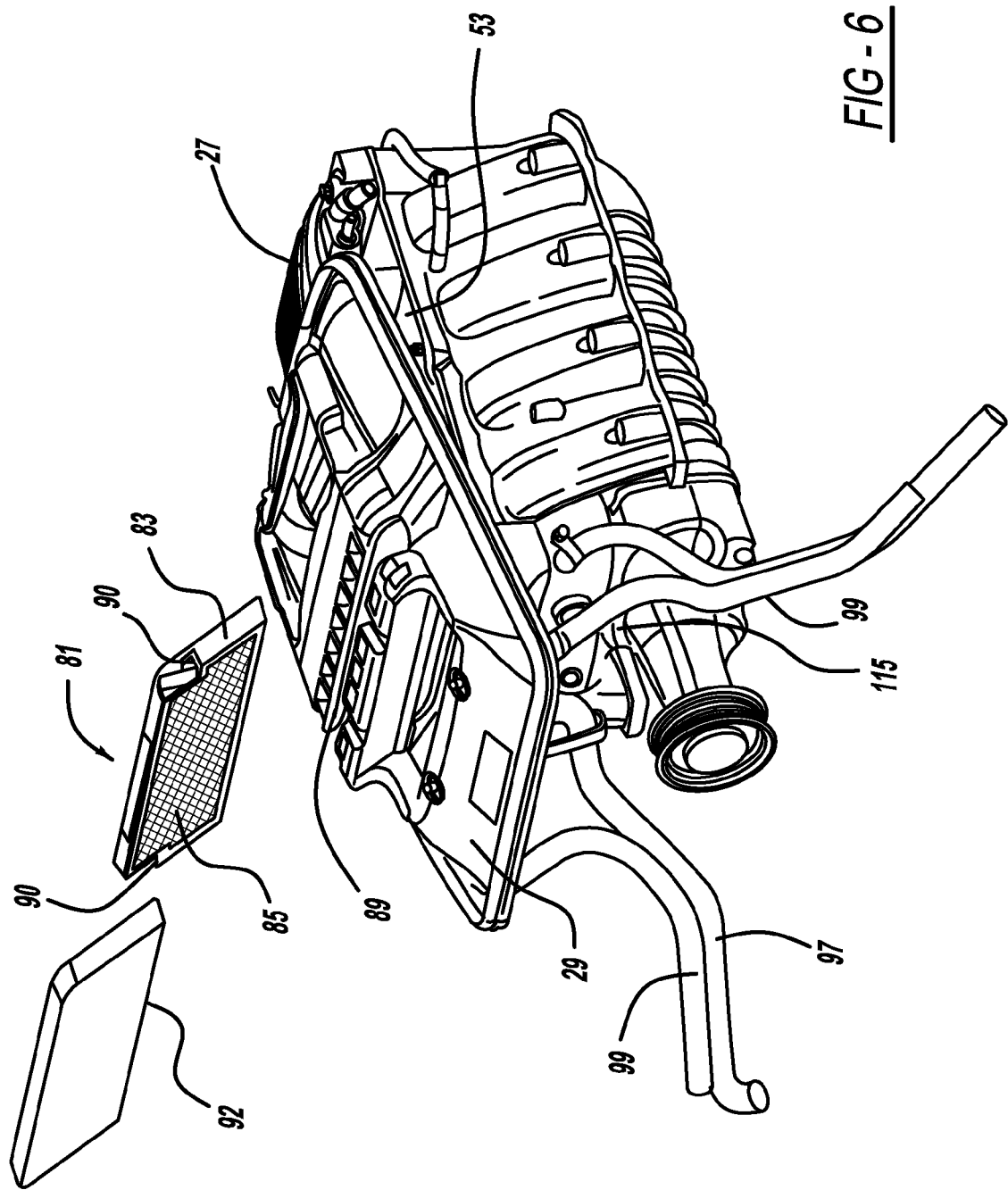
FIG. 6 is a front perspective view showing the preferred embodiment apparatus with the scoop removed.

Referring now to FIGS. 6, 7 and 10, a generally rectangular filter assembly 81 includes a frame 83 and a high flow air filter 85 mounted therein defining a generally flat leading face 87. Frame 83 is preferably made from a semi-rigid urethane polymeric material such that when it is slid into a channel 89 of air box 29, it will seal against the adjacent air box walls. Downwardly extending bosses 91 (see FIG. 5) of scoop 31 are positioned within notches 90 and serve to retain filter assembly 81 within air box 29, yet allow for servicing of the air filter by removal of the scoop from the air box. Air filter assembly 81 is preferably tilted with an upper edge thereof closer to air inlet 49 relative to its lower edge such that any moisture collecting on the filter assembly will run through holes in the bottom of the air box channel 89 thereby draining the water from the filter and air box. An optional air permeable sock 92 may cover air filter 85 to provide an extra layer of protection from contamination.

Figure 4:
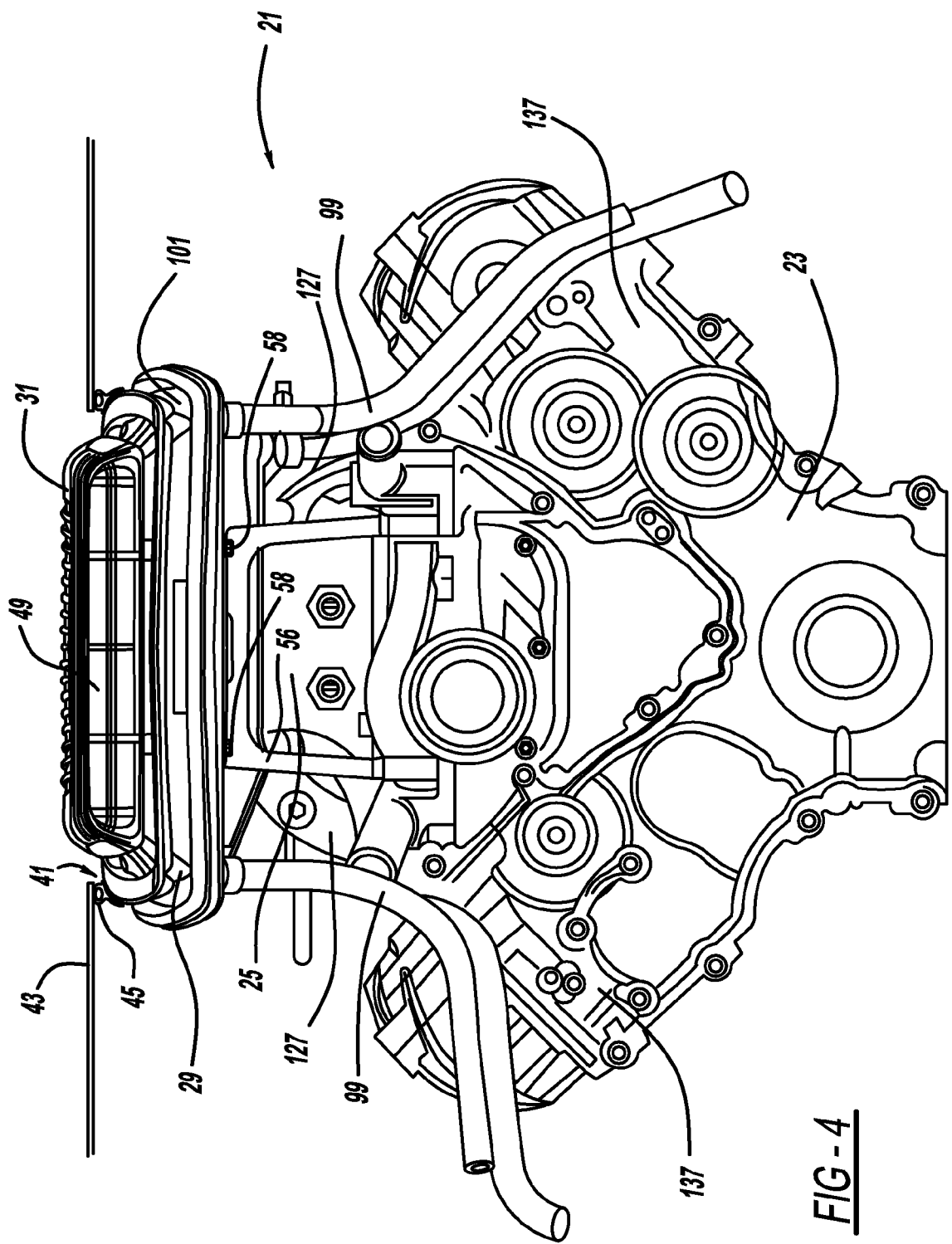
FIG. 4 is a front elevational view showing the preferred embodiment apparatus.

Air box 29 includes a number of water management features to minimize the quantity of water that may reach air filter assembly 81 during vehicle operation such as in a heavy rain or travelling through a car wash. Air box 29 includes a foil 93 that extends downwardly from inlet 49 of scoop 31 toward a sump 95. A drain tube 97 provides a passageway for water captured within sump 95 to exit air box 29. Two additional drain tubes 99 are laterally spaced apart from one another to drain an area 101 that is defined when the vehicle hood is closed, as best shown in FIG. 4. A deflector wall 103 provides a surface for water droplets to impact if present with the air entering inlet 49. The water has a tendency to adhere to either foil 93 or deflector wall 103 and drip off their bottom edges into sump 95. Deflector wall 103 is angled to include an upper portion positioned closer to inlet 49 than a lower portion of deflector wall 103. Air filter assembly 81 is positioned substantially parallel and spaced apart from deflector wall 103.

It is contemplated that some users of the described engine apparatus may prefer the flexibility to remove and selectively replace deflector wall 103. Removal of wall 103 may increase air flow through air box 29. However, the water management benefits of wall 103 will be lost. To address this issue, a selectively insertable replacement deflector may be provided. If inclement weather or a water filled atmosphere is predicted, a user may fasten the replacement deflector to air box 29 at the same or similar location to previously present wall 103. If a need exists for reduced air flow restriction, the replacement deflector may be easily removed and replaced again when desired.

A first dam 105 also urges water entrained within the air intake air flow to be deposited within sump 95. First dam 105 is positioned downstream of deflector wall 103 and restricts water from travelling further toward air filter assembly 81. A second dam 107 is spaced apart from first dam 105 and also acts to restrict water from entering air filter assembly 81. It should be appreciated that the upper edge of air filter assembly 81 is substantially vertically aligned with a trough 109 defined by first dam 105 and second dam 107. At least one opening is in communication with trough 109 to allow the collected water to escape from air box 29.

During operation, cool exterior air is flowed into inlet 49 of scoop 31, slightly downwardly along foil 93 of air box 29, through air box 29 and through the installed air filter 85. The still cool and dense air is subsequently flowed through throttle valve 57 (depending upon its operating position), through rigid snorkel 27 and to an inlet 111 of manifold assembly 25 defined by an opening in lid 53. The flow path for the incoming intake air is preferably less than about twenty inches, and more preferably equal to or less than about ten inches, as measured from inlet 49 of scoop 31 to inlet throttle valve 57. This flow path directly feeds the intake air from the shaker to the manifold in a generally straight and laminar flow direction and primarily directly above the manifold assembly, thereby maintaining the desired density of the air with minimal pressure losses from the shaker to the manifold. Furthermore, this fluid flow path and conduit configuration is expected to maintain the incoming air at a desirably cool temperature of less than 150° F.

FIGS. 7 and 9-11 best illustrate manifold assembly 25. Manifold assembly 25 includes lid 53 and an air intake manifold 115 which are screwed together. Manifold 115 includes a main body within which is located a supercharger intercooler 117. A pair of rotatable screws or impellers 121 for the supercharger are located in a lower cavity of manifold 115. An internal incoming air conduit 123 connects inlet 111 to the lower cavity and a central passageway 125 connects the lower cavity to the main body adjacent intercooler 117. Two banks of opposed runners 127 are accessible within the main body of manifold 115 above intercooler 117. The supercharger is preferably of the type disclosed in U.S. Patent Publication No. 2007/0175456 entitled "Apparatus and Method for Boosting Engine Performance" invented by Tally and published on Aug. 2, 2007, which is incorporated by reference herein.

Referring to FIG. 4, internal combustion engine 23 is preferably a multi-valve, supercharged and fuel injected type having a V-8 engine block. It should be alternately be appreciated, however, that 4, 6, 10 or other numbers of cylinders can be employed. The present apparatus is ideally suited for either direct factory installation onto engine 23 or for retrofitting in an after-market installation situation by the vehicle owner in various preassembled kit configurations.

The scoop, lid and snorkel may be cast from aluminum. The air intake manifold may be machined from aluminum 6061. The air box is preferably roto molded from a rigid polyethylene polymer. Thus, the air intake system is of a light weight, durable and rigid construction, especially as compared to conventionally flexible tubes.

Figure 11:
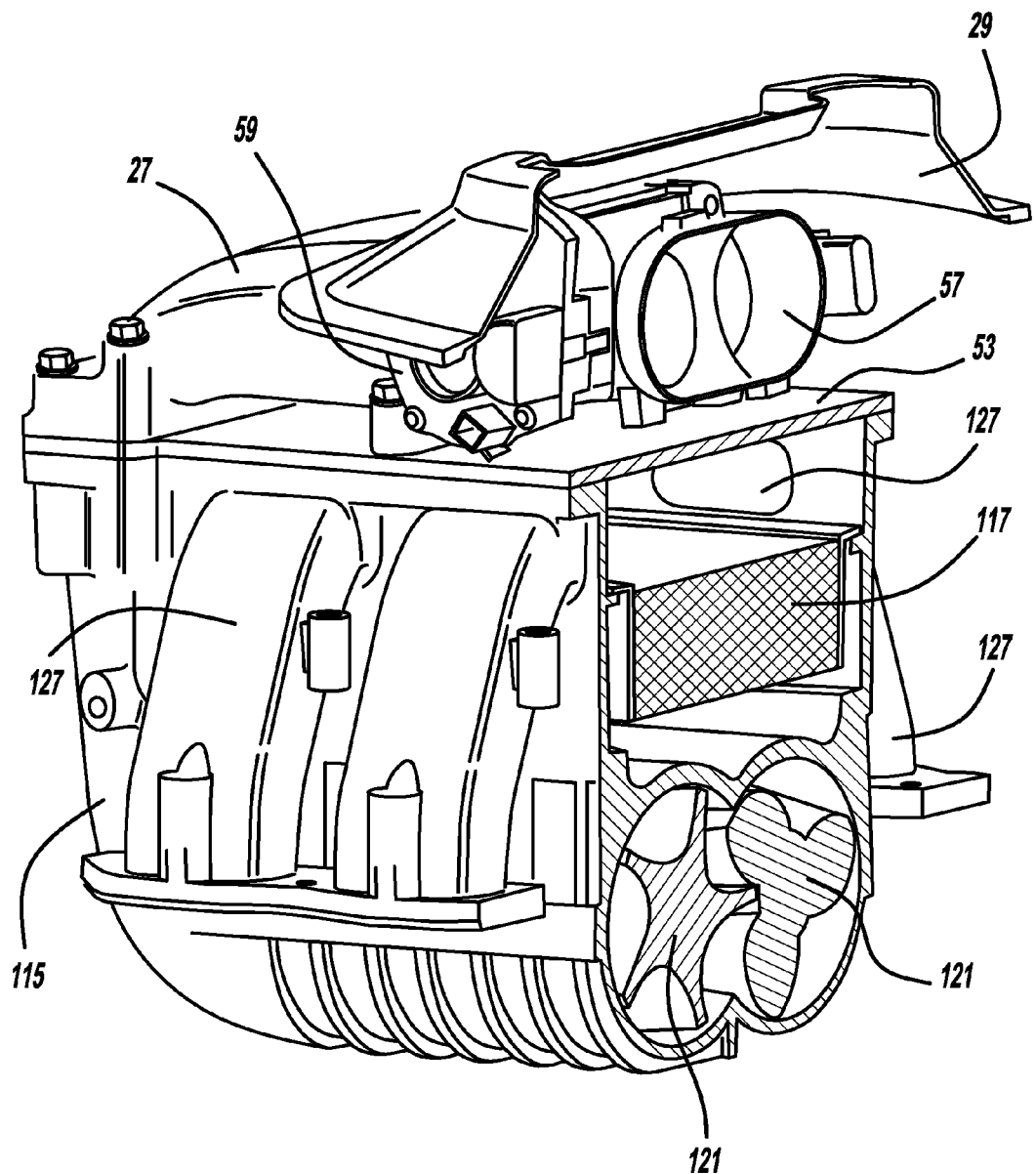
FIG. 11 is a fragmented, front perspective view showing the preferred embodiment apparatus.

Referring to FIGS. 1, 4 and 11, the apparatus of the present application can either be assembled at the original equipment automobile manufacturer's manufacturing plant during normal factory production or may be sold as an after-market retrofit kit for assembly by the vehicle owner or retail dealership. The retrofit kit option will now be discussed hereafter. First, the supercharger components, including screws 121 and intercooler 117, are preassembled within manifold 115. Second, the air intake system of scoop 31, air box 29, throttle valve 57 and snorkel 27, is preassembled onto manifold lid 53 and manifold 115, as a preassembled unit or kit. The air intake system subassembly may be preassembled and sold together as part of the supercharged manifold subassembly, or assembled and sold as a retrofit to an existing supercharged engine.

Prior to installation of the preassembled air intake and supercharged manifold kit, the user must create hole 41 within hood 43. This is preferably done by laying out a template onto the hood, drilling small holes in the necessary locations and then sawing hole 41 pursuant to the template. The trim ring is then installed around the periphery defining hole 41.

Next, the user must disassemble and/or remove various components from the existing, stock factory engine prior to installation of the retrofit air intake and supercharged manifold kit. For example, the stock factory air cleaner outlet pipe, engine wire harness, vacuum tube, vacuum hose and the like must be removed. Furthermore, the fuel rails must be removed from the stock factory engine. Thereafter, the stock factory intake manifold is removed and the coolant and heater hoses are disconnected. Subsequently, the accessory drive belt and alternator are removed. Thereafter, the idler pulley is removed.

After this initial preparatory work, the retrofit air intake and supercharged manifold kit embodiment of the present apparatus is then mounted onto engine 23 such that the lower ports of runners 127 are in communication and aligned with appropriate openings within each engine head 137. Flanges adjacent runners 127 of manifold 115 are bolted onto ledges of heads 137 with the appropriate sealing gaskets therebetween. A new alternator pulley may be necessary, and the alternator is then remounted and the belt is reinstalled. The hoses and tubes for heating and cooling are reinstalled. Furthermore, the fuel rails and fuel injectors are assembled, the vacuum line is attached and then the electrical engine wire harness is attached.

The embodiments and examples described herein are exemplary and not intended to be limiting in describing the full scope of devices, apparatus, systems, and methods of the present disclosure. Equivalent changes, modifications and variations of the embodiments, materials and methods can be made within the scope and spirit of the present disclosure, with substantially similar results.

The invention claimed is:

1. An automotive vehicle apparatus comprising:
   a manifold assembly including an air intake manifold and a lid covering the manifold;
   a snorkel mounted on the lid and having a first opening in communication with the manifold assembly;
   a valve coupled to the snorkel and having a passageway in communication with a second opening of the snorkel;
   an air box positioned above the manifold assembly, the air box having a bore in communication with the passageway of the valve, a majority of the incoming air flowing along a substantially straight path through the air box;
   an air scoop mounted to the air box and operably directing air from outside the vehicle to the air box, the incoming air flowing directly from the scoop to the manifold; and
   a supercharger member located within the manifold.

2. The apparatus of claim 1 wherein the air box includes a downwardly angled foil bounding an opening of the air box and positioned to direct water entering the air box into a sump, the apparatus further including a drain tube in communication with the sump to allow the water to exit the air box.

3. The apparatus of claim 2 wherein the air box includes a wall positioned at an end of an air scoop passageway to restrict water from contacting an air filter mounted within the air box.

4. The apparatus of claim 3 wherein the wall includes an upper portion and a lower portion, the wall being angled such that the upper portion is closer to an air inlet of the air scoop than the lower portion.

5. The apparatus of claim 4 wherein the wall is positioned adjacent to the opening in the air box and directs water entering the air scoop into the sump.

6. The apparatus of claim 3 wherein the air filter and the wall extend substantially parallel to one another.

7. The apparatus of claim 3 wherein the air box includes a first dam positioned adjacent the sump to restrict water from traveling toward the air filter.

8. The apparatus of claim 7 wherein the first dam is positioned downstream of the wall.

9. The apparatus of claim 8 wherein the air box includes a second dam spaced apart from and positioned downstream of the first dam, the first and second dams defining a trough therebetween to collect water.

10. The apparatus of claim 3 wherein the wall is selectively removable and replaceable.

11. The apparatus of claim 1 further including a mass air flow sensor mounted to the air box in communication with the incoming air flow.

12. The apparatus of claim 1 further including a positive crankcase ventilation system air make up nipple mounted to the air box in communication with the incoming air flow.

13. The apparatus of claim 1 wherein the air box is rotomolded to include a substantially constant wall thickness.

* * * * *